United States Patent [19]

Kujirai et al.

[11] Patent Number: 5,715,705
[45] Date of Patent: Feb. 10, 1998

[54] EVAPORATOR/EXPANSION VALVE UNIT FOR USE IN AUTOMATIVE AIR CONDITIONING SYSTEM

[75] Inventors: Toshisada Kujirai; Masahiro Sano, both of Sano; Hiroaki Sasaki, Yokohama; Yukio Nakazawa, Samukawa; Naoharu Shibuya, Tokyo, all of Japan

[73] Assignee: Calsonic Corporation, Tokyo, Japan

[21] Appl. No.: 724,952

[22] Filed: Oct. 2, 1996

[30] Foreign Application Priority Data

Oct. 2, 1995 [JP] Japan ................... 7-254900

[51] Int. Cl.⁶ .................................. F25B 41/04
[52] U.S. Cl. ................. 62/528; 62/225; 62/525
[58] Field of Search .................. 236/92 B; 62/225, 62/527, 528, 525

[56] References Cited

U.S. PATENT DOCUMENTS

| | | | |
|---|---|---|---|
| 4,589,265 | 5/1986 | Nozawa | 62/527 |
| 4,593,539 | 6/1986 | Humpolik et al. | 62/527 |
| 4,712,384 | 12/1987 | Crowe | 62/527 |
| 4,809,518 | 3/1989 | Murayaya | 62/527 |

*Primary Examiner*—William E. Tapolcal
*Attorney, Agent, or Firm*—Foley & Lardner

[57] ABSTRACT

An evaporator/expansion valve unit for use in an automotive air conditioning system, comprises an evaporator which includes first and second parallely extending elongate tanks and a plurality of flat hollow elements mounted on the first and second elongate tanks. The interior of each element is in a fluid communication with the interior of each tank. The first tank is formed with inlet and outlet openings. A block type expansion valve has a first passage which is closed when a spherical valve body abuts against a given part of the first passage against a certain force applied thereto and a second passage which has a temperature sensing means by which the certain force is varied in accordance with the temperature of a refrigerant flowing in the second passage. The first passage has an outlet opening connected to the inlet opening of the first tank. The second passage has an inlet opening connected to the outlet opening of the first tank. The expansion valve has the first tank directly mounted thereon.

17 Claims, 6 Drawing Sheets

FIG.8
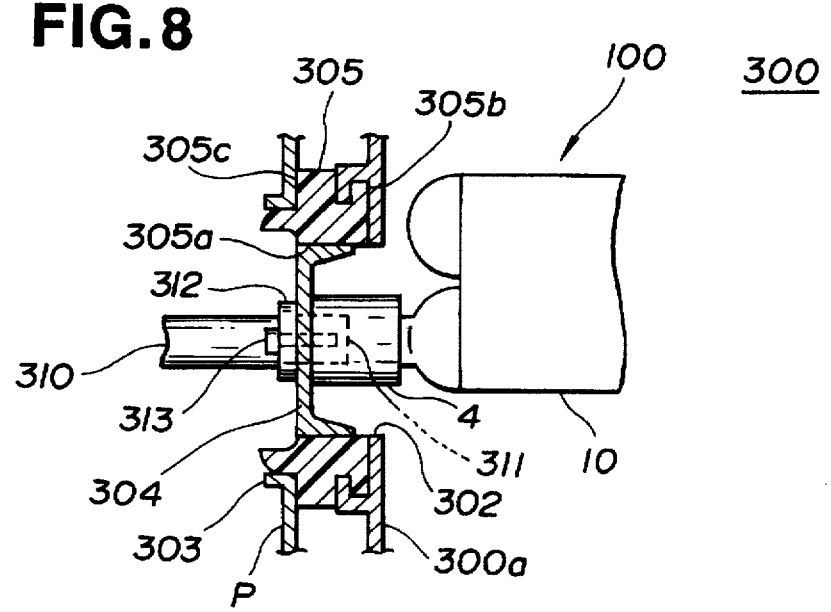
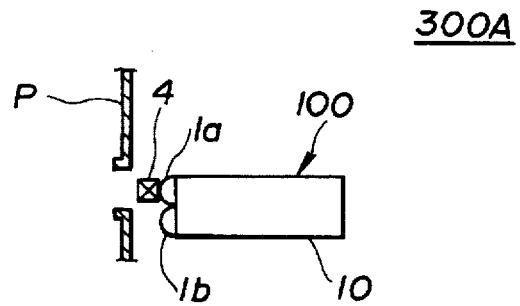
FIG.9A
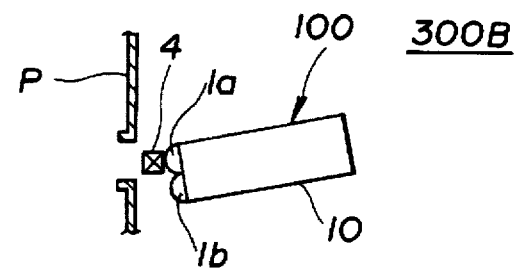
FIG.9B
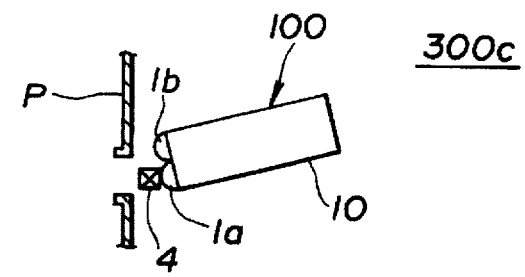
FIG.9C

EVAPORATOR/EXPANSION VALVE UNIT FOR USE IN AUTOMATIVE AIR CONDITIONING SYSTEM

BACKGROUND OF THE INVENTION

1. Field of the Invention

The present invention relates in general to an automotive air conditioning system and more particularly to an evaporator/expansion valve unit installed in a cooler unit or heater/cooler unit of the system. More specifically, the present invention is concerned with an evaporator/expansion valve unit which is assembled compact in size.

2. Description of the Prior Art

In a cooler unit or heater/cooler unit of an automotive air conditioning system, there is sometimes employed a block type expansion valve. This type expansion valve comprises a base block having first and second passages formed therethrough. The first passage has an inlet opening connected to a liquid tank and an outlet opening connected to an inlet opening of an evaporator, and the second passage has an inlet opening connected to an outlet opening of the evaporator and an outlet opening connected to a compressor. In the first passage, there is arranged a spherical valve body which is pressed against a given part of the passage to close the same against a force applied thereto. In the second passage, there is arranged a temperature sensing means by which the force applied to the spherical valve body is varied in accordance with the temperature of a refrigerant flowing through the second passage.

Hitherto, two pipes have been used for connecting the block type expansion valve with the evaporator. That is, one pipe extends from the first passage of the valve to the inlet opening of the evaporator and the other pipe extends from the outlet opening of the evaporator to the second passage of the valve.

However, usage of such pipes tends to induce that parts of the pipes extend over a front or rear side of the evaporator, which causes marked increase in air flow resistance of the evaporator. Furthermore, usage of such pipes causes a bulky construction of a unit which includes the block type expansion valve and the evaporator.

For ease of description, the unit including the block type expansion valve and the evaporator will be referred to as "evaporator/expansion valve unit" in the following.

SUMMARY OF THE INVENTION

It is therefore an object of the present invention to provide an evaporator/expansion valve unit which is free of the above-mentioned drawbacks.

According to a first aspect of the present invention, there is provided an evaporator/expansion valve unit for use in an automotive air conditioning system, which comprises an evaporator including first and second parallely extending elongate tanks and a plurality of flat hollow elements mounted on the first and second elongate tanks, the interior of each element being in a fluid communication with the interior of each tank; means defining in the first tank both inlet and outlet openings; and an expansion valve having a first passage which is closed when a spherical valve body abuts against a given part of the first passage against a certain force applied thereto and a second passage which has a temperature sensing means by which the certain force is varied in accordance with the temperature of a refrigerant flowing in the second passage, the first passage having an outlet opening connected to the inlet opening of the first tank, the second passage having an inlet opening connected to the outlet opening of the first tank, wherein the expansion valve has the first tank directly mounted thereon.

According to a second aspect of the present invention, there is provided a cooler unit of an automotive air conditioning system which comprises a case having an opening; an evaporator installed in the case, the evaporator including first and second parallely extending elongate tanks and a plurality of flat hollow elements mounted on the first and second elongate tanks, the interior of each element being in a fluid communication with the interior of each tank; means defining in the first tank both inlet and outlet openings; and an expansion valve having a first passage which is closed when a spherical valve body abuts against a given part of the first passage against a certain force applied thereto and a second passage which has a temperature sensing means by which the certain force is varied in accordance with the temperature of a refrigerant flowing in the second passage, the first passage having an outlet opening connected to the inlet opening of the first tank, the second passage having an inlet opening connected to the outlet opening of the first tank, the expansion valve having the first tank directly mounted thereon, wherein the evaporator stands in the case placing the first and second tanks under the evaporator and wherein the expansion valve is exposed to the outside of the case through the opening of the case.

According to a third aspect of the present invention, there is provided a heater/cooler unit of an automotive air conditioning system, which comprises a case having air inlet and outlet openings between which an air flow passage is defined; a heater core arranged in the air flow passage; an evaporator arranged in the air flow passage at a position upstream of the heater core, the evaporator including first and second parallely extending elongate tanks and a plurality of flat hollow elements mounted on the first and second elongate tanks, the interior of each element being in a fluid communication with the interior of each tank; means defining in the first tank both inlet and outlet openings; and an expansion valve having a first passage which is closed when a spherical valve body abuts against a given part of the first passage against a certain force applied thereto and a second passage which has a temperature sensing means by which the certain force is varied in accordance with the temperature of a refrigerant flowing in the second passage, the first passage having an outlet opening connected to the inlet opening of the first tank, the second passage having an inlet opening connected to the outlet opening of the first tank, the expansion valve having the first tank directly mounted thereon, wherein the heater core and the evaporator are horizontally arranged, and wherein the expansion valve is exposed to the outside of the case through an opening formed in the case.

BRIEF DESCRIPTION OF THE DRAWINGS

Other objects and advantages of the invention will become apparent from the following description when taken in conjunction with the accompanying drawings, in which.

3

Figure 5:
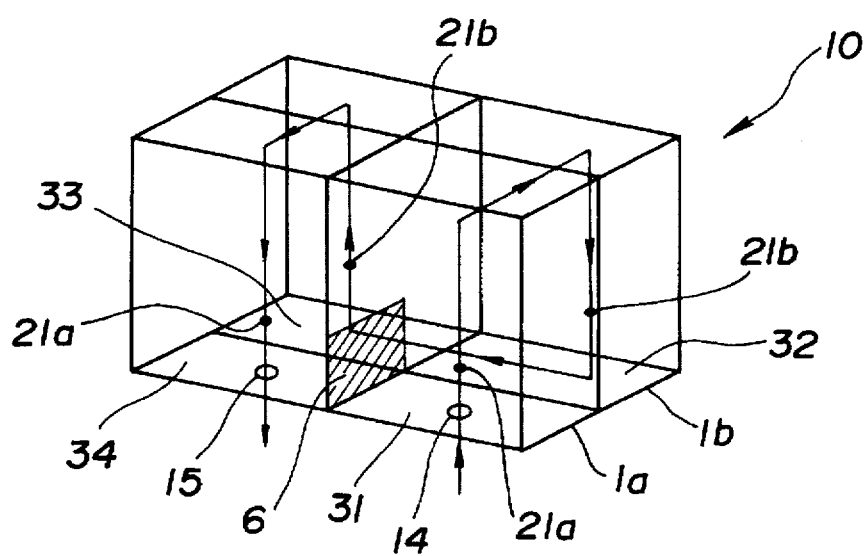
Figure 6:
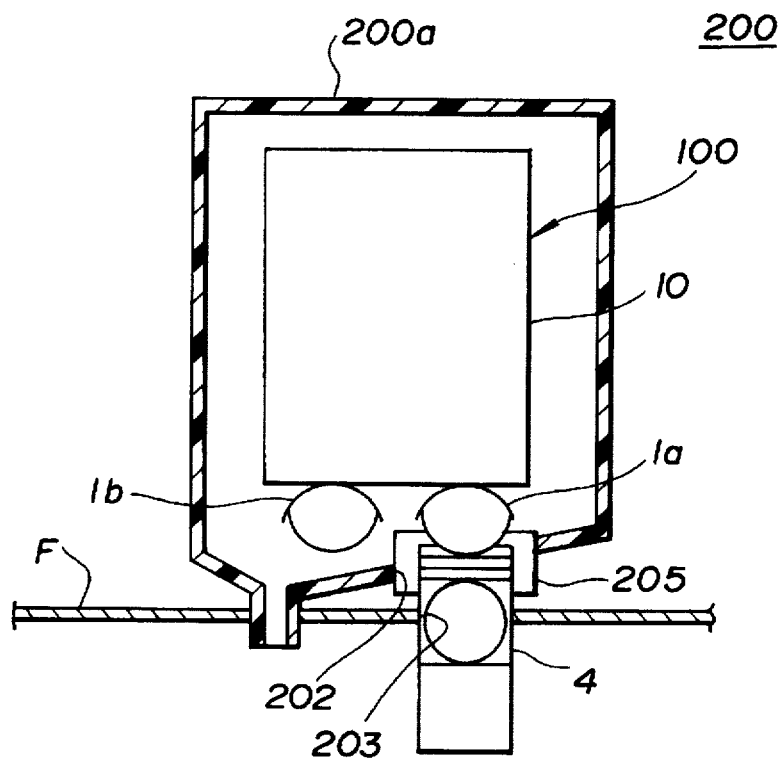
Figure 7:
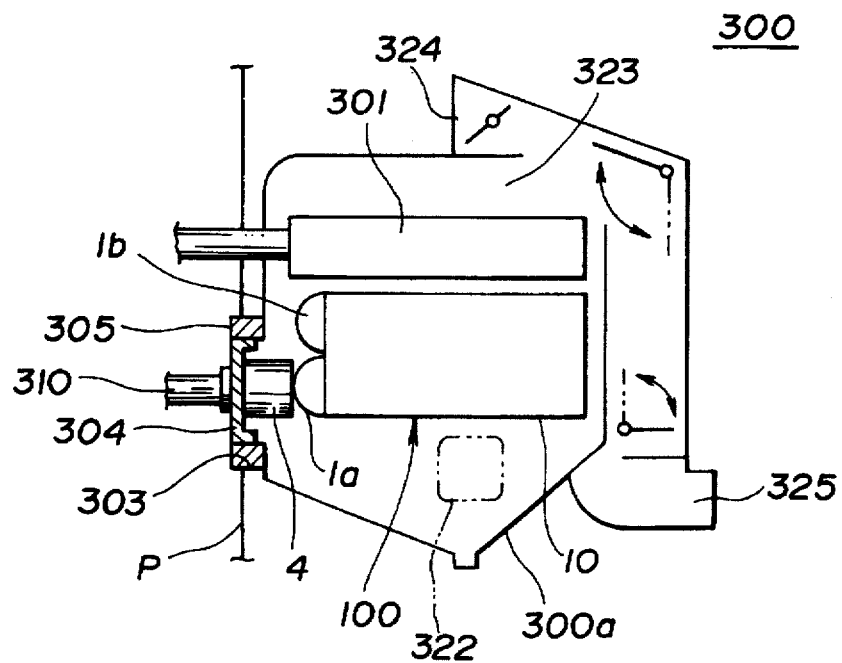
Figure 10:
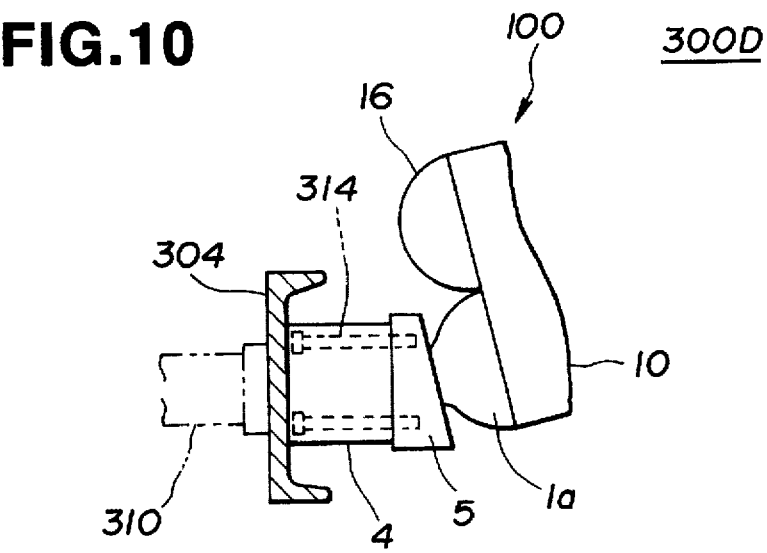
Figure 11:
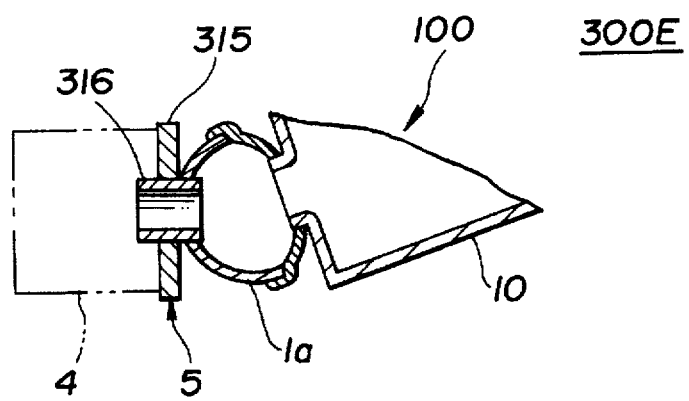
Figure 12:
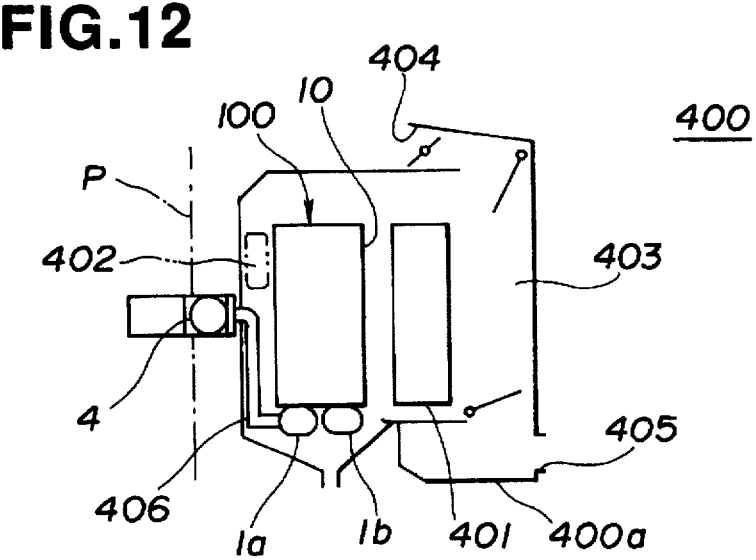

FIG. 5 is a schematic view of the evaporator employed in the invention, showing the manner in which a refrigerant flows in the evaporator;

FIG. 6 is a sectional view of a cooler unit in which the evaporator/expansion valve unit of the invention is practically installed;

FIG. 7 is a sectional view of a heater/cooler unit in which the evaporator/expansion valve unit of the invention is practically installed;

FIG. 8 is an enlarged view of an essential portion of the heater/cooler unit of FIG. 7;

FIGS. 9A, 9B and 9C are partial views of FIG. 7, but showing other positions which the evaporator/expansion valve unit can take in the case;

FIGS. 10 and 11 are partial views of FIG. 7, but showing flanges other than a flange employed in FIG. 7; and FIG. 12 is a view similar to FIG. 7, but showing another heater/cooler unit in which the evaporator/expansion valve unit is practically installed.

DETAILED DESCRIPTION OF THE EMBODIMENTS

Referring to FIGS. 1 to 5, there is shown an evaporator/expansion valve unit 100 according to the present invention.

Figure 1:
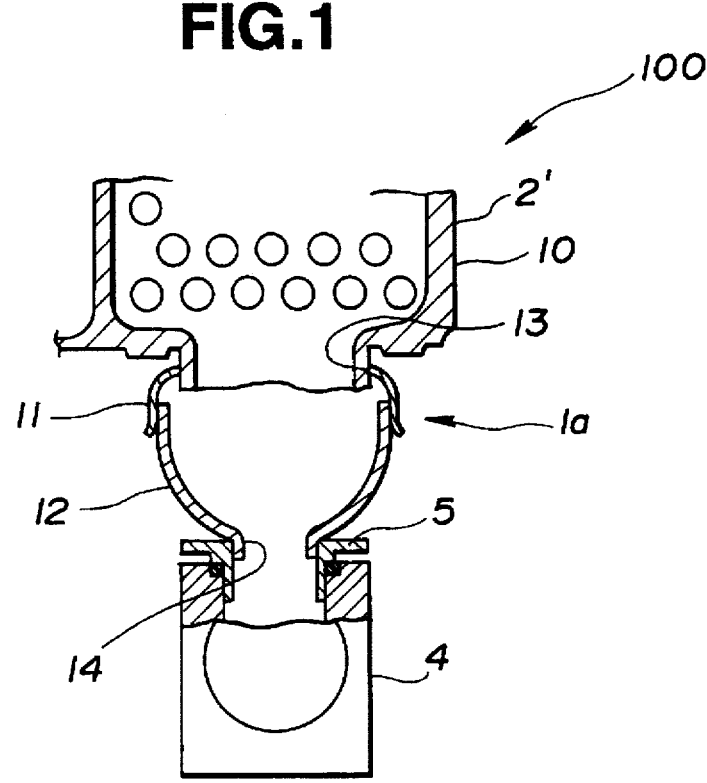
FIG. 1 is a sectional view of an essential portion of an evaporator/expansion valve unit according to the present invention.
Figure 2:
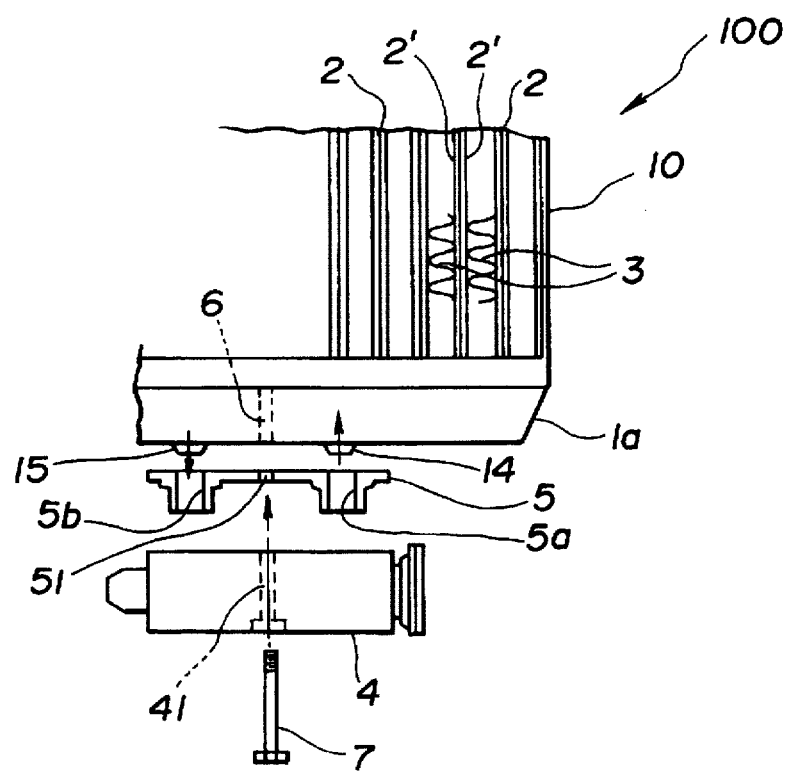
FIG. 2 is an exploded side view of the essential portion of the evaporator/expansion valve unit of the invention.
Figure 3:
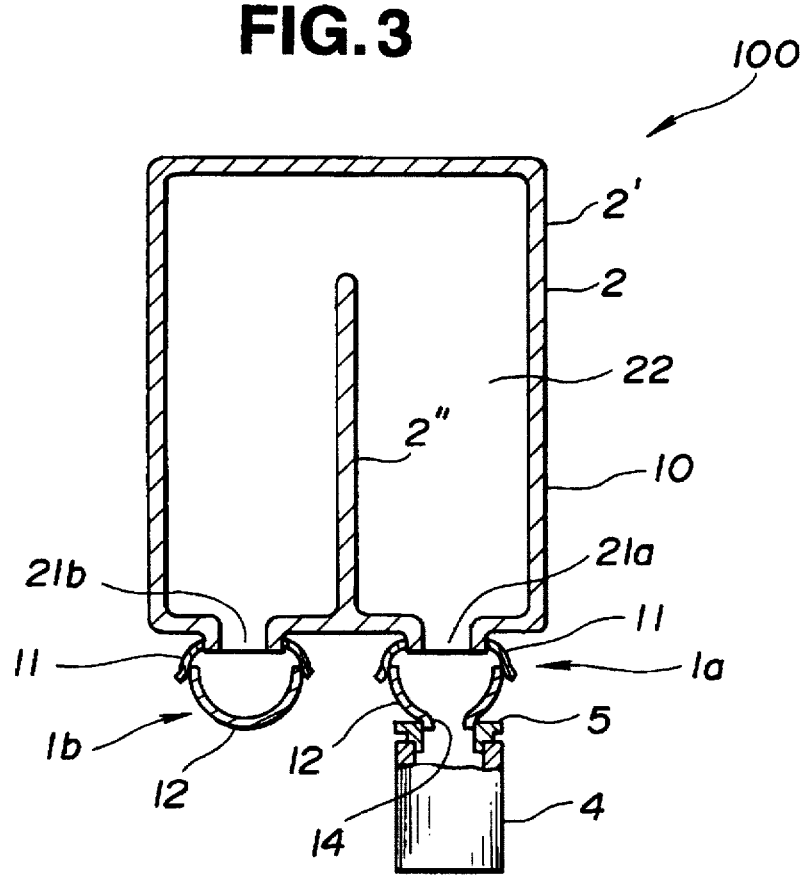
FIG. 3 is a sectional view of the evaporator/expansion valve unit of the invention.

As is seen from FIGS. 1, 2 and 3, the evaporator/expansion valve unit 100 of the invention generally comprises an evaporator 10 and a block type expansion valve 4.

The evaporator 10 comprises a plurality of parallel flat hollow elements 2. Each element 2 consists of a pair of depressed metal plates 2' which are coupled to form an enclosed thin flat space therebetween.

As is seen from FIG. 3, within the enclosed flat space of the element 2, there is placed a center bank 2" by which a generally U-shaped flow passage 22 is defined from the space. Openings 21a and 21b are formed in laterally spaced portions of a lower end of the element 2. Each opening 21a or 21b is formed in a downwardly projected portion of the element 2. As will be described in detail hereinafter, a refrigerant is led into the U-shaped flow passage from the opening 21a and travels in passage 22 and discharges from the other opening 22b.

As is seen from FIG. 2, corrugated fins 3 are disposed between adjacent two of the elements 2 for increasing heat exchanging area. That is, in operation, certain heat exchanging takes place between air which passes through the fins 3 and the refrigerant which flows in the elements 2.

As is seen from FIGS. 2 and 3, the cluster of the elements 2 are mounted and aligned on two (that is, first and second) elongate tanks 1a and 1b in such a manner that the elements 2 are arranged side by side. Each tank 1a or 1b comprises an elongate convex upper plate 11 and an elongate convex lower plate 12 which are coupled to constitute an elongate tubular construction.

As is seen from FIGS. 1 and 3, the upper plate 11 of each tank 1a or 1b is formed with a plurality of slits 13 into which the apertured projections 21a or 21b of the elements 2 are inserted and welded thereto to achieve a hermetic seal therebetween.

As is seen from FIGS. 2 and 3, the lower plate 12 of the first tank 1a is formed at longitudinally spaced portions thereof with inlet and outlet openings 14 and 15. As shown in FIG. 2, a partition wall 6 is installed in the tank 1a to divide the interior of the same into right and left (or inlet and outlet) chambers to which the inlet and outlet openings 14 and 15 are respectively exposed. As is seen from the drawing, a right half of the elements 2 is incorporated with the right chamber and a left half of them is incorporated with the left chamber.

4

In the second tank 1b, there is no member corresponding to the partition wall 6. As will be described in detail hereinafter, through the inlet opening 14, there is introduced a refrigerant from a liquid tank 53 (see FIG. 4), while through the outlet opening 15, there is discharged the refrigerant toward a compressor 54 (see FIG. 4). A cooling cycle shown in FIG. 4 generally comprises a compressor 54, a condenser 52, a liquid tank 53, an expansion valve 4 and the evaporator 10.

FIG. 5 schematically shows the manner in which the refrigerant from the expansion valve circulates in the evaporator 10. It is to be noted that designated by numeral 31 is the above-mentioned right chamber 31 of the tank 1a, and designated by numeral 34 is the left chamber of the same. Designated by numeral 32 is a right half of the interior of the other tank 1b, and designated by numeral 33 is a left half of the same. With no partition wall in the other tank 1b, the right and left halves are fully communicated.

That is, in operation, the refrigerant led into the right chamber 31 of the first tank 1a through the inlet opening 14 flows into the right half elements 2 through the openings 21a and flows in the U-shaped flow passages 22 of the elements 2 and then discharges to the right half 32 of the second tank 1b through the openings 21b. The refrigerant thus led into the right half 32 flows leftward toward the left half 33 of the tank 1b, then flows into the left half elements 2 through the openings 21b, then flows in the U-shaped flow passages 22 of the elements 2 and then discharges to the left chamber 34 of the first tank 1a through the openings 21a. The refrigerant led to the left chamber 34 is directed toward the compressor 54 through the outlet opening 15.

For production of the convex lower plate 12 of each tank 1a or 1b, a flat metal plate is drawn to produce a gutter-shaped structure and drilled or punched to produce the inlet and outlet openings 14 and 15. If a suitable press machine is used, these steps are achieved at one time. In any case, the plate 12 can be produced easily.

As is best shown in FIG. 2, in the invention, the block type expansion valve 4 is connected to the first tank 1a through a flange 5. The flange 5 is of a dual type having inlet and outlet openings 5a and 5b. The flange 5 is welded to the lower plate 12 of the tank 1a in a manner to mate the openings 5a and 5b with the inlet and outlet openings 14 and 15 respectively. The flange 5 is formed with a threaded hole 51. The expansion valve 4 is formed with a bolt hole 41 through which a connecting bolt 7 passes and is engaged with the threaded hole 51. With the bolt 7, the expansion valve 4 is tightly but detachably connected to the flange 5.

Figure 4:
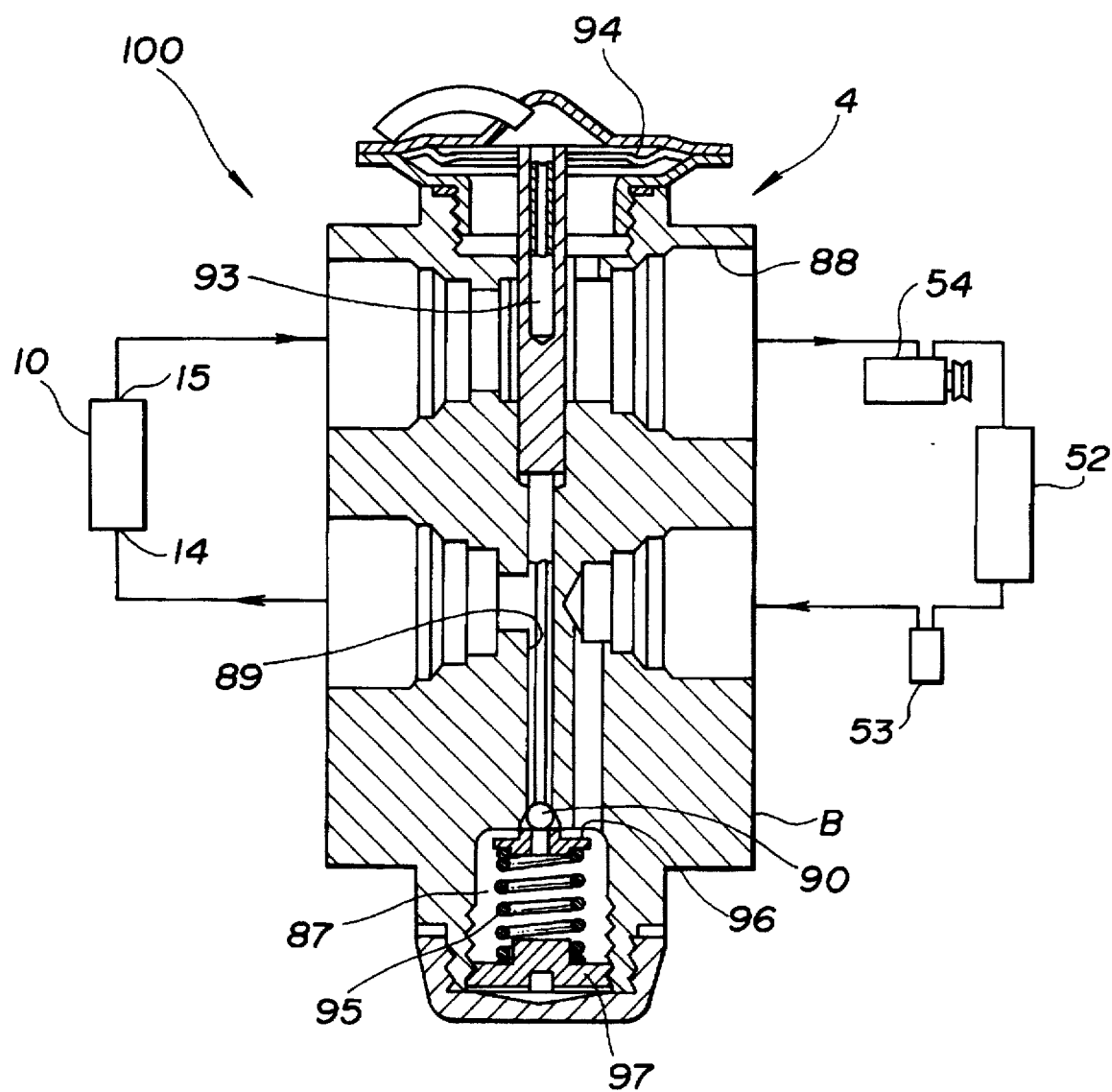
FIG. 4 is a sectional view of the expansion valve employed in the invention.

As is best shown in FIG. 4, the block type expansion valve 4 comprises a base block B which has first and second flow passages 87 and 88 formed therethrough. The first passage 87 has an upstream end connected to an outlet port of the liquid tank 53 and a downstream end connected to the inlet opening 14 of the evaporator 10, while the second passage 88 has an upstream end connected to the outlet opening 15 of the evaporator 10 and a downstream end connected to an inlet port of the compressor 54.

In the first passage 87, there is defined a section 89 where a highly compressed refrigerant is decompressed to effect adiabatic expansion. A spherical valve body 90 is incorporated with the section 89 to open and close the same. The valve body 90 is biased to close the section 89 by a biasing unit which is received in an enlarged section of the passage 87. The biasing unit comprises a holder 96 for supporting the valve body 90, a coil spring 95 for biasing the valve body 90 through the holder 96 and a adjusting screw 97 for adjusting the biasing force applied to the valve body 90.

Within the section 89, there is slidably received a push rod 92 which has a lower end put on the spherical valve body 90 and an upper end connected to a diaphragm 94 which serves as a temperature sensing means 93. The diaphragm 94 has an upper chamber which is filled with a thermally expandable gas and a lower chamber which is communicated with the second passage 88. Thus, the volume of the upper chamber varies in accordance with the temperature possessed by the refrigerant which flows in the second passage 88. That is, when, due to increased thermal load of the evaporator 10, the temperature of the refrigerant flowing in the second passage 88 increases, the volume of the upper chamber increases thereby pushing the push rod 92 against the spherical valve body 90. With this, the valve body 90 opens the section 89 against the force of the biasing unit. Under this condition, the refrigerant is permitted to flow from the liquid tank 53 to the evaporator 10. While, when, due to reduced thermal load of the evaporator 10, the temperature of the refrigerant flowing in the second passage 88 decreases, the volume of the upper chamber reduces thereby separating the push rod 92 from the spherical valve body 90. With this, the valve body 90 closes the section 89 with the force of the biasing unit. Under this condition, the refrigerant flow from the liquid tank 53 to the evaporator 10 is blocked. By turning the adjusting screw 97, the biasing force of the spring 95 applied to the valve body 90 is varied and thus the amount of refrigerant supplied to the evaporator 100 can be adjusted. Due to the above-mentioned function, the condition of the refrigerant at the outlet opening 15 of the evaporator 10 is kept constant.

As is described hereinabove, in the invention, the expansion valve 4 is directly connected to the tank 1a. More specifically, the expansion valve 4 is connected to the first tank 1a through only the small flange 5. That is, in the invention, there is no need of using any connecting pipes, such as aluminum pipes or the like, which connect the expansion valve 4 with the first tank 1a. Thus, the evaporator/expansion valve unit 100 of the invention can be constructed small and the cost of same can be reduced.

In the following, some examples wherein the evaporator/ expansion valve unit 100 is employed in an automotive air conditioning system will be described with reference to FIGS. 6 to 12.

In the first example of FIG. 6, the evaporator/expansion valve unit 100 is installed in a rear cooler unit 200 of a dual air conditioning system. That is, the unit 100 is housed in a case 200a of the unit 200 exposing the expansion valve 4 through an opening 202 formed in the case 200a. The cooler unit 200 is mounted on a floor panel "F" of the vehicle and the evaporator/expansion valve unit 100 stands in the case 200a, as shown. In this example, the exposed expansion valve 4 is placed in an opening 203 of the vehicle floor panel "F" with a sealing member 205 disposed therebetween.

As is understood from the drawing, in this first example, due to usage of the flange 5 through which the expansion valve 4 is connected to the evaporator 10, there is no need of using a conventional piping arrangement between the evaporator 10 and the expansion valve 4, which allows compactness of the cooler unit 200.

In the second example of FIG. 7, the evaporator/ expansion valve unit 100 is installed in a heater/cooler unit 300 of an air conditioning system. The unit 300 comprises a case 300a connected to a dash panel "P" under an instrument panel (not shown). The case 300a has the evaporator/expansion valve unit 100 and a heater core 301 which are horizontally installed therein. Due to presence of the heater core 301, there are defined in the case 300a two shorter air passages, one being a first shorter passage including the heater core 301 and the other being a second shorter passage bypassing the heater core 301. Although not shown in the drawing, a mix door is arranged at upstream ends of the first and second shorter passages. Designated by numeral 322 is an air inlet opening through which air from an air intake unit (not shown) is led into a lower portion of the case 300a. The upstream ends of the first and second shorter passages are merged with a downstream portion of the evaporator 10 and the downstream ends of the passages are merged with an air mix chamber 323. The air mix chamber 323 has various air outlet openings 324 and 325 which are led through respective ducts (not shown) to various portions of a passenger room of the vehicle. That is, air led into the lower portion of the case 300a from the air intake unit is forced to travel upward toward the air mix chamber 323 through the evaporator 10 and one or both of the first and second shorter passages. The air thus conditioned in the air mix chamber 323 is blown to the various portions through the air outlet openings 324 and 325. For controlling the amount of the air blown to the passenger room, various control doors (no numerals) are arranged, as shown.

In the second example, the evaporator/expansion valve unit 100 is housed in the case 300a of the unit 300 exposing the expansion valve 4 through an opening 302 formed in the case 300a. The heater/cooler unit 300 is mounted to the dash panel "P" having the exposed expansion valve 4 placed in an opening 303 of the dash panel "P" with a cover 304 and a sealing member 305 disposed therebetween. The cover 304 may be made of a plastic, a metal (aluminum) or the like. An inlet pipe 310 from a liquid tank 53 (see FIG. 4) and an outlet pipe (not shown) led to a compressor 54 (see FIG. 4) are connected to the expansion valve 4.

As is shown in detail in FIG. 8, the sealing member 305 is of a rubber material which has an inner end 305a pressed against the cover 304, a left end 305b pressed against the case 300a and a right end 305c pressed against the dash panel "P". Each of the inlet and outlet pipes 310 has a flange 312 secured to the cover 304 through bolts 313. Each bolt 313 passes through an opening formed in the flange 312 and is screwed into a threaded bore formed in a casing of the expansion valve 4. Designated by numeral 311 is a leading end of the inlet or outlet pipe, which is sealingly received in an inlet or outlet opening forced in the casing of the expansion valve 4.

As is understood from the drawings, also in this second example, for the same reasons as described in the first example, there is no need of using a conventional piping arrangement between the evaporator 10 and the expansion valve 4, which allows compactness of the heater/cooler unit 300. Furthermore, because of usage of the bolts 313, the inlet and outlet pipes 310 can be easily disconnected from the expansion valve 4 when needed, which facilitates the manual work for dismantling the heater/cooler unit 300 from the vehicle and thus facilitates the maintenance of the unit 300.

Referring to FIG. 9A, there is shown a first modification 300A of the heater/cooler unit 300 of FIG. 7. In this modification 300A, the unit 300 has the evaporator/ expansion valve unit 100 turned upside down. That is, the unit 100 is arranged having the first tank 1a positioned above the second tank 1b.

Referring to FIG. 9B, there is shown a second modification 300B of the heater/cooler unit 300 of FIG. 7. In this modification, the unit 300 has the evaporator/expansion valve unit 100 turned upside down and the unit 100 is inclined relative to a horizontal plane, preferably by about 5 to 20 degrees.

Referring to FIG. 9C, there is shown a third another modification of the heater/cooler unit 300 of FIG. 7. In this modification, the evaporator/expansion valve unit 100 is inclined by about 5 to 20 degrees.

Referring to FIG. 10, there is shown a fourth modification 300D of the, heater/cooler unit 300. In this modification, a flange 5 having an inclined mounting surface is employed to which the first tank 1a of the inclined evaporator/expansion valve unit 100 is connected. The flange 5 is secured to the expansion valve 4 through bolts 314. With usage of the flange 5 having such a inclined mounting surface, the evaporator 100 and the expansion valve 4 can be assembled compactly.

Referring to FIG. 11, there is shown a fifth modification 300E of the heater/cooler unit 300. A flange 5 employed in this modification 300E comprises a flat plate 315 and two connecting pipes 316 each passing through the flat plate 315. That is, through the two pipes 316, the fluid communication between the tank 1a and the expansion valve 4 is established.

In the third example of FIG. 12, the evaporator/expansion valve unit 100 stands in a heater/cooler unit 400 of an air conditioning system. That is, as is shown in the drawing, in this example, the unit 100 is installed in the unit 400 in such a manner that the longitudinal axis thereof extends vertically. The unit 400 comprises a case 400a connected to a dash panel "P" under an instrument panel (not shown). The case 400a has the evaporator/expansion valve unit 100 and a heater core 4 which are vertically installed therein. Due to presence of the heater core 401, there are defined in the case 400a two shorter air passages, one being a first shorter passage including the heater core 401 and the other being a second shorter passage bypassing the heater core 401. Although not shown in the drawing, a mix door is arranged at upstream ends of the first and second shorter passages. Designated by numeral 402 is an air inlet opening through which air from an intake unit (not shown) is led into the case 400a. The upstream ends of the first and second shorter passages are merged with a downstream portion of the evaporator 10 and the downstream ends of the shorter passages are merged with an air mix chamber 403. The air mix chamber 403 has various air outlet openings 404 and 405 which are led through respective ducts (not shown) to various portions of a passenger room of the vehicle. For controlling the amount of air directed to the openings 404 and 405, various control doors (no numerals) are arranged.

As shown, in the third example, the evaporator/expansion valve unit 100 stands in the case 400a having the two tanks 1a and 1b positioned at a lower portion of the case 400a. Metal pipes 406, for example, aluminum pipes, are used for connecting the first tank 1a with the expansion valve 4 which is supported by the dash panel "P".

What is claimed is:

1. An evaporator/expansion valve unit for use in an automotive air conditioning system, comprising:

an evaporator including first and second parallely extending elongate tanks and a plurality of flat hollow elements mounted on said first and second elongate tanks, the interior of each element being in a fluid communication with the interior of each tank;

means defining in said first tank both inlet and outlet openings; and an expansion valve having a first passage which is closed when a spherical valve body abuts against a given part of the first passage against a certain force applied thereto and a second passage which has a temperature sensing means by which said certain force is varied in accordance with the temperature of a refrigerant flowing in said second passage, said first passage having an outlet opening connected to said inlet opening of said first tank, said second passage having an inlet opening connected to said outlet opening of said first tank, wherein said expansion valve has said first tank directly mounted thereon.

2. An evaporator/expansion valve unit as claimed in claim 1, further comprising a flange through which said first tank is mounted on said expansion valve.

3. An evaporator/expansion valve unit as claimed in claim 2, in which said flange is welded to said first tank.

4. An evaporator/expansion valve unit as claimed in claim 3, in which said flange is of a dual type which has an inlet opening through which the outlet opening of said first passage is communicated with the inlet opening of said first tank and an outlet opening through which the outlet opening of said first tank is communicated with the inlet opening of said second passage.

5. An evaporator/expansion valve unit as claimed in claim 4, in which said expansion valve unit is detachably connected to said flange by means of a connecting bolt, said connecting bolt passing through a bolt hole formed in said expansion valve and being engaged with a threaded bolt hole formed in said flange.

6. An evaporator/expansion valve unit as claimed in claim 1, in which each of said first and second tanks comprises;

an elongate convex upper plate formed with a plurality of slits into which apertured lower projections said elements are projected; and an elongate convex lower plate formed with said inlet and outlet openings, said lower and upper plates being coupled to constitute an elongate tubular structure.

7. An evaporator/expansion valve unit as claimed in claim 1, in which each hollow element is provided therein with a center bank by which the interior thereof defines a generally U-shaped flow passage which has one opening merged with the interior of said first tank and the other opening merged with the interior of said second tank.

8. An evaporator/expansion valve unit as claimed in claim 7, in which said first tank is provided therein with a partition wall by which the interior of said first tank is divided into inlet and outlet chambers to which the outlet opening of said first passage and the inlet opening of said second passage are connected respectively.

9. An evaporator/expansion valve unit as claimed in claim 1, in which said evaporator further comprises corrugated fins which are disposed between adjacent two of the hollow elements to increase heat exchanging area.

10. An evaporator/expansion valve unit as claimed in claim 2, in which said flange has an inclined surface to which said first tank is directly connected.

11. An evaporator/expansion valve unit as claimed in claim 2, in which said flange comprises a flat plate and two connecting pipes each passing through said flat plate.

12. A cooler unit of an automotive air conditioning system comprises:

a case having an opening;

an evaporator installed in said case, said evaporator including first and second parallely extending elongate tanks and a plurality of flat hollow elements mounted on said first and second elongate tanks, the interior of each element being in a fluid communication with the interior of each tank;

means defining in said first tank both inlet and outlet openings; and an expansion valve having a first passage which is closed when a spherical valve body abuts against a given part of the first passage against a certain force applied thereto and a second passage which has a temperature sensing means by which said certain force is varied in accordance with the temperature of a refrigerant flowing in said second passage, said first passage having an outlet opening connected to said inlet opening of said first tank, said second passage having an inlet opening connected to said outlet opening of said first tank, said expansion valve having said first tank directly mounted thereon, wherein said evaporator stands in said case placing said first and second tanks under said evaporator and wherein said expansion valve is exposed to the outside of said case through the opening of said case.

13. A heater/cooler unit of an automotive air conditioning system, comprising:

a case having air inlet and outlet openings between which an air flow passage is defined;

a heater core arranged in said air flow passage;

an evaporator arranged in said air flow passage at a position upstream of said heater core, said evaporator including first and second parallely extending elongate tanks and a plurality of flat hollow elements mounted on said first and second elongate tanks, the interior of each element being in a fluid communication with the interior of each tank;

means defining in said first tank both inlet and outlet openings; and an expansion valve having a first passage which is closed when a spherical valve body abuts against a given part of the first passage against a certain force applied thereto and a second passage which has a temperature sensing means by which said certain force is varied in accordance with the temperature of a refrigerant flowing in said second passage, said first passage having an outlet opening connected to said inlet opening of said first tank, said second passage having an inlet opening connected to said outlet opening of said first tank, said expansion valve having said first tank directly mounted thereon, wherein said heater core and said evaporator are horizontally arranged, and wherein said expansion valve is exposed to the outside of said case through an opening formed in the case.

14. A heater/cooler unit as claimed in claim 13, in which said evaporator is arranged in such a manner that said first tank is placed below said second tank.

15. A heater/cooler unit as claimed in claim 13, in which said evaporator is arranged in such a manner that said second tank is placed below said first tank.

16. A heater/cooler unit as claimed in claim 14, in which said evaporator is inclined by about 5 to 20 degrees relative to said heater core.

17. A heater/cooler unit as claimed in claim 15, in which said evaporator is inclined by about 5 to 20 degrees relative to said heater core.

* * * * *

UNITED STATES PATENT AND TRADEMARK OFFICE
CERTIFICATE OF CORRECTION

PATENT NO. : 5,715,705
DATED : Feb. 10, 1998
INVENTOR(S) : Kujirai et al.

It is certified that error appears in the above-identified patent and that said Letters Patent is hereby corrected as shown below:

On the title page, Item
--[73] Assignee: Calsonic Corporation, Tokyo, Japan and
Nissan Motor Co., Ltd., Yokohama-shi, Japan--

Signed and Sealed this

Twenty-ninth Day of December, 1998

*Attest:*

BRUCE LEHMAN

*Attesting Officer*     *Commissioner of Patents and Trademarks*